US006938348B2

(12) United States Patent
Roncaglia

(10) Patent No.: US 6,938,348 B2
(45) Date of Patent: Sep. 6, 2005

(54) TOOL DEVICE FOR ROTARY KNIVES

(75) Inventor: Graziano Roncaglia, Modena (IT)

(73) Assignee: LGR Equipment di Graziano Roncaglia—Frazione Portile, Modena (IT)

( * ) Notice: Subject to any disclaimer, the term of this patent is extended or adjusted under 35 U.S.C. 154(b) by 0 days.

(21) Appl. No.: 10/698,512

(22) Filed: Nov. 3, 2003

(65) Prior Publication Data

US 2004/0088866 A1 May 13, 2004

(30) Foreign Application Priority Data

Nov. 6, 2002 (IT) .................................... MO2002A0320

(51) Int. Cl.[7] ............................................... A22C 17/04
(52) U.S. Cl. ......................................... 30/276; 452/133
(58) Field of Search .......................... 30/276, 347, 286, 30/388, 389, 390; 452/132, 133, 137

(56) References Cited

U.S. PATENT DOCUMENTS 1,255,657 A * 2/1918 Steinheimer ................. 30/276
3,722,033 A * 3/1973 Swan ......................... 452/115
4,439,924 A 4/1984 Bettcher
4,637,140 A * 1/1987 Bettcher ....................... 30/276
4,800,650 A 1/1989 Johansson
5,311,664 A * 5/1994 Abdul .......................... 30/276
5,551,156 A * 9/1996 Elmer .......................... 30/276
5,664,332 A * 9/1997 Whited et al. ................ 30/276
5,692,307 A * 12/1997 Whited et al. ................ 30/276
5,761,817 A * 6/1998 Whited et al. ................ 30/276
6,751,872 B1 * 6/2004 Whited et al. ................ 30/276
6,769,184 B1 * 8/2004 Whited ........................ 30/276

FOREIGN PATENT DOCUMENTS

EP 0 826 454 3/1998

* cited by examiner

*Primary Examiner*—Hwei-Siu Payer
(74) *Attorney, Agent, or Firm*—Guido Modiano; Albert Josif; Daniel O'Byrne

(57) ABSTRACT

A tool device for rotary knives of the type that comprises a handle associated with a tool supporting assembly and an actuation for the rotary actuation of the tool with respect to the tool supporting assembly, the tool comprising a substantially tubular coupling body that is associable with the tool supporting assembly and being provided with a coupling to the actuation, and a cutter that is rigidly associated with the body and is arranged so as to protrude substantially radially with respect to the body.

14 Claims, 2 Drawing Sheets

TOOL DEVICE FOR ROTARY KNIVES

BACKGROUND OF THE INVENTION

The present invention relates to a tool device for rotary knives particularly for cutting animal meat.

In the field of animal meat butchering and processing it is known to use manual knives provided with variously shaped blades in order to perform, for example, cutting, fat removal and boning of the meat.

However, the use of these knives forces the operator to perform considerable efforts, especially in view of the fact that the meat to be processed is stored in refrigerating rooms at low temperature and therefore offers considerable resistance to cutting.

As working hours go by, the increasing tiredness of the operator causes an increase in the risk of injury, slows down work and distinctly reduces the productivity of the operator.

Moreover, the use of manual knives requires considerable experience and skill on the part of operators in order to contain the production of waste caused for example by imperfect cuts and in order to reduce the danger of accidents at work.

In order to obviate these drawbacks it is also known to use rotary knives that are substantially constituted by a handle, which is provided with a circular support for the application of a circular tool and is associated with actuation means that are adapted to actuate said tool with a rotary motion about an axis that lies transversely to the handle.

The actuation means are constituted by motor means that are associated with the tool by interposing a gear-type drive; the motor means can be of the electrical or pneumatic type.

The tool is constituted by a sort of sleeve, which is provided with a toothed edge for coupling to a driving pinion that is accommodated in the handle and is associated with the motor means and has a sharp opposite edge.

The size of the tool and of the corresponding support varies according to the type of process to be performed.

In use, the operator grips the handle and moves the tool, which is actuated so as to rotate and is arranged so that its sharp edge is directed toward the piece of meat to be processed, tangentially thereto, in order to perform fat removal or boning, or longitudinally through said piece of meat.

However, said rotary knives do not allow to slice pieces of meat, i.e., to perform transverse cuts and form slices.

To perform these processes, pneumatically-operated knives are also known which are provided with one or more straight blades that are actuated with a reciprocating rectilinear motion with respect to a support that is rigidly coupled to a handle.

However, these pneumatic knives also are not free from drawbacks, including the fact that the high rate at which the blades perform the cutting stroke can cause unpleasant aching and tingling in the hand and arm of the operator and that their overall weight, particularly for knives with a plurality of blades, makes them awkward to use for prolonged periods.

SUMMARY OF THE INVENTION

The aim of the present invention is to eliminate the above-noted drawbacks of the prior art, by providing a tool for rotary knives that allows to perform meat slicing processes easily and with limited physical effort and to increase the productivity of these operations.

Within this aim, an object of the present invention is to provide a tool that is simple, relatively easy to provide in practice, safe in use, effective in operation, and of a relatively low cost.

This aim and this and other objects that will become better apparent hereinafter are achieved by the present tool for rotary knives of the type that comprises a handle that is associated with a tool supporting assembly and means for the rotary actuation of a tool with respect to said tool supporting assembly, comprising a substantially tubular coupling body that is associable with said tool supporting assembly and is provided with means for coupling to said actuation means, and cutting means that are rigidly associated with said body, characterized in that said cutting means are arranged so that they protrude substantially radially with respect to said body.

BRIEF DESCRIPTION OF THE DRAWINGS

Further characteristics and advantages of the present invention will become better apparent from the following detailed description of a preferred but not exclusive embodiment of a tool for rotary knives, illustrated by way of non-limiting example in the accompanying drawings, wherein.

DESCRIPTION OF THE PREFERRED EMBODIMENTS

Figure 1:
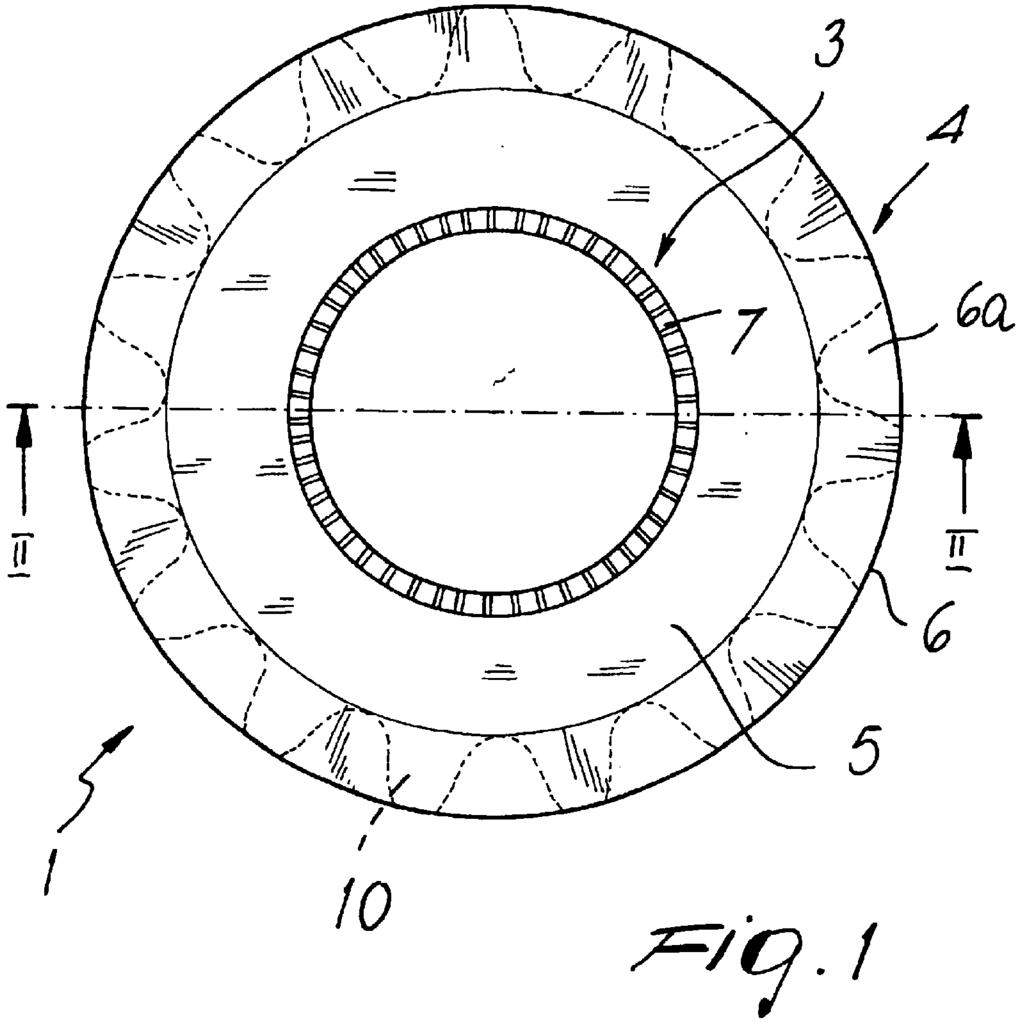
FIG. 1 is a schematic plan view of a tool for rotary knives according to the invention.
Figure 2:
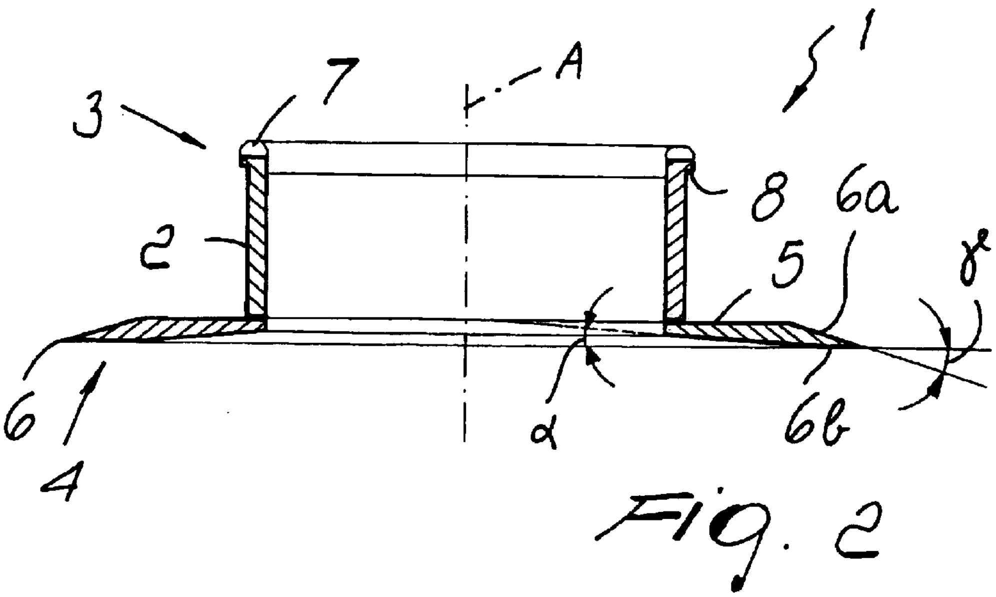
FIG. 2 is a sectional view, taken along the line II—II of FIG. 1, of the tool according to the invention.

With reference to the figures, the reference numeral 1 generally designates a tool for rotary knives.

Figure 3:
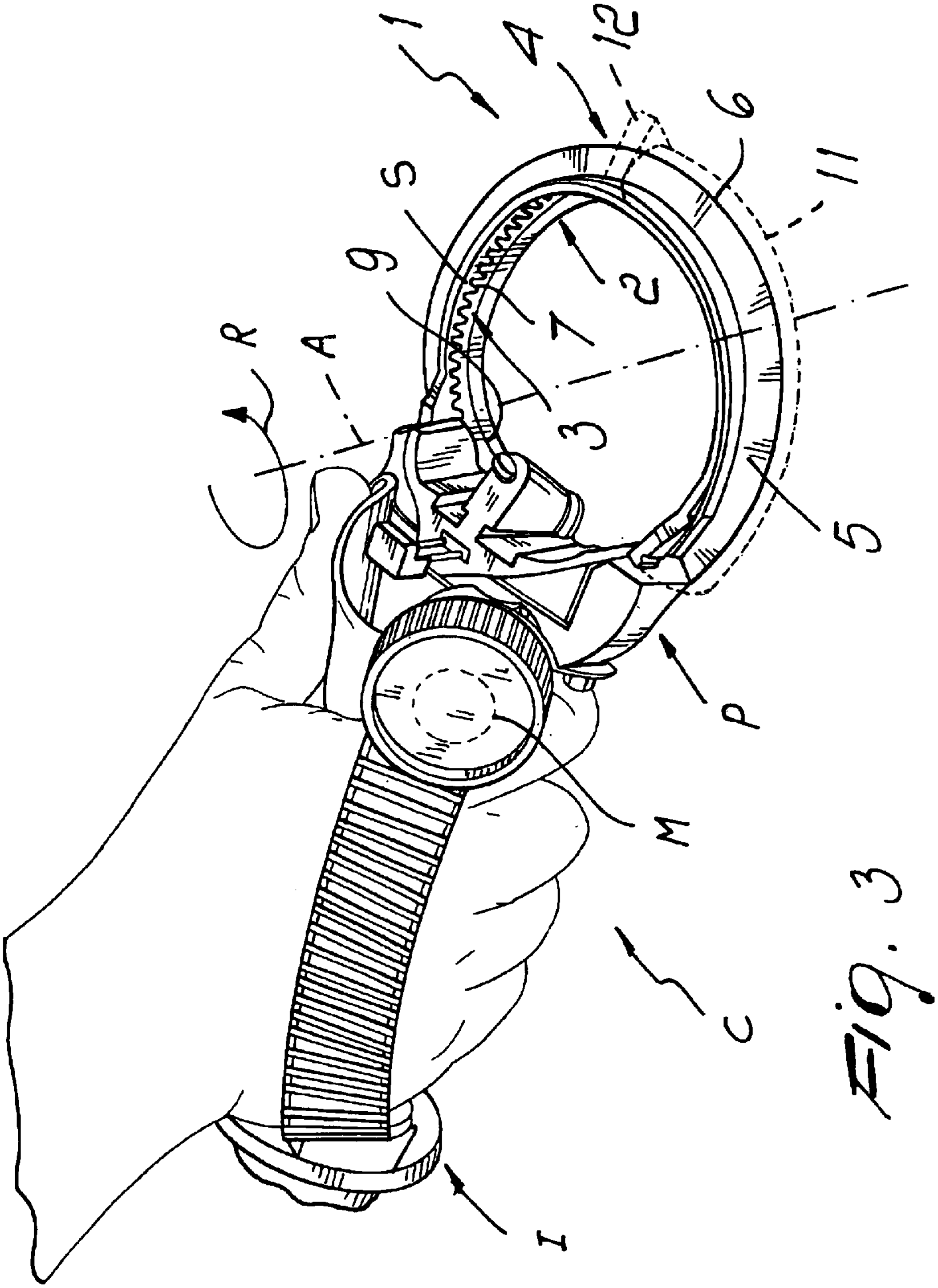
FIG. 3 is a perspective view of the tool according to the invention, fitted on a conventional rotary knife.

The tool 1 is designed to be applied to a conventional rotary knife C, which is shown partially in FIG. 3 and is of the type that comprises a handle I that is internally hollow and is associated at one end with a tool supporting assembly P.

The knife C further comprises conventional actuation means that are adapted to turn about a rotation axis A the tool 1 with respect to the tool supporting assembly P.

The rotation axis A is arranged transversely to the handle I and coincides with the axis of symmetry of the tool 1.

The tool supporting assembly P, not shown in detail because it is of a conventional type, is provided with a first portion that comprises a contoured claw, which is fixed to the handle I and is associated with a circular support S of the tool 1, and with a second portion that is constituted by a movable claw, which is associated with the fixed claw by means of conventional threaded elements or the like and is adapted to keep the tool 1 in position during use without however limiting its possibility to rotate about the axis A.

Appropriate slots, not shown in the figures, are provided on the facing surfaces of said claws and form a seat for accommodating the tool 1 when said claws are closed.

The actuation means comprise motor means M that are associated with the tool 1 by interposing a drive unit which comprises a driving pinion 9 that is arranged so as to protrude from the handle I at the fixed claw and is rigidly coupled to a pivot that is accommodated so that it can rotate inside said handle.

The motor means can be of the electrical or pneumatic type or of another type.

The electrical motor means, for example, are constituted by an electric motor of the conventional type, in which the output shaft is associated with the pivot of the driving pinion by means of a flexible shaft that is inserted partially inside the handle I.

The pneumatic motor means are instead constituted by an impeller or the like that is accommodated inside the handle I and is associated with the driving pinion by interposing a gear-type reduction unit, which is also accommodated inside the handle I.

In this case, on the handle I there is a coupling for connection to a source of compressed air, such as a compressed air distribution system, a compressor or other device, that is already provided next to the line.

The air jet drives the impeller, which turns the driving pinion.

The tool 1 comprises a substantially tubular coupling body 2, which is associable with the tool supporting unit P and is provided with means 3 for coupling to the driving pinion 9.

The tool 1 further comprises cutting means 4 that are monolithically associated with the body 2 and protrude substantially radially with respect to said body.

In use, the cutting motion of the tool 1 is generated by the rotation about the axis A, designated by the arrow R in FIG. 3, while the feed motion of said tool is transmitted by the operator, who actuates the knife C on which the tool 1 is fitted in any direction that lies on the plane formed by the cutting means 4 and transversely to a block of animal meat to be cut, sliced or subjected to other processes.

In the particular embodiment shown in the figures, the cutting means 4 are constituted by an annular plate 5 that is arranged substantially at right angles to the body 2 at one of its ends, protrudes outside said body and has a peripheral portion that is shaped so as to provide a perimetric circular cutting edge 6.

The dimensions of the plate 5 and of the corresponding circular support S can vary according to the size of the pieces of meat to be processed.

In an alternative embodiment of the invention, not shown in the figures, the plate 5 can have a contoured external perimeter and a substantially quadrangular shape with rounded corners.

In this case, the cutting edge 6 is constituted by a plurality of straight and curved portions that are mutually alternated.

It is further possible to provide further embodiments of the tool 1 in which the cutting edge 6 is constituted for example by a plurality of contoured sharp teeth 10, partially schematically shown in dashed lines in FIG. 1, which are distributed with a constant spacing on the outside perimeter of the body 2 and are arranged so as to protrude in a substantially radial direction from said body.

Such teeth can have a pointed or convex shape, i.e., a curved profile that protrudes from the body 2, or a concave shape, i.e., a curved profile that is directed inward toward said body.

The cutting edge 6 can have a cutting angle $\gamma$, where $\gamma$ is the angle between the face 6*a* and the side 6*b* of said cutting edge, which is comprised between 10° and 18°.

Moreover, the cutting edge 6 can have a relief angle $\alpha$, which is the angle comprised between the side 6*b* and the plane that contains the cutting edge 6, that is comprised between 2° and 6°.

Advantageously, in the embodiment shown in the figures, the cutting edge 6 has a cutting angle $\gamma$ equal to 14° and a relief angle $\alpha$ equal to 4°.

The cutting edge 6 has a substantially smooth profile but as an alternative it can be saw-toothed, undulated, or otherwise shaped.

The coupling means 3 are constituted by a toothed ring 7, which is rigidly coupled to the body 2 and has the same modulus as the driving pinion.

The toothed ring 7 has a diameter that is on the order of the diameter of the body 2 and is arranged at the end of said body that is located opposite the plate 5.

Finally, the body 2 is provided on its outer surface with an annular shoulder 8 for fitting on the tool supporting assembly P.

The plate 5 and the shoulder 8 prevent movements in a direction that is parallel to the axis A of the tool 1 during use.

Conveniently, conventional protection means such as a protective shell 11, shown partially, in transparency in FIG. 3, are applied to the circular support S; such protective shell is arranged outside the cutting edge 6 and is adapted to cover the portion of said cutting edge that is arranged opposite with respect to the active portion during cutting.

The shell 11 allows to reduce the risk of injury to operators during use of the tool 1 fitted on the knife C.

It is noted in fact that on animal meat processing lines the stations of the operators are generally arranged side by side and rather close to each other; said protective shell allows to prevent an operator from accidentally injuring another operator located next to him.

Conveniently, it is possible to provide an element 12 for the abutment of the material to be cut, such as a wedge or the like, which is arranged at the cutting edge 6 at the active portion during cutting and is adapted to be arranged during processing on the opposite side of the material to be cut with respect to the knife C.

The abutment element 12 can be fixed to the knife C by way of connecting means of a conventional type.

It is noted that the tool 1 can be advantageously used in cutting materials other than animal meat, such as for example fabrics, hides, synthetic fibers and others, as a replacement of conventional industrial cutters or pneumatic scissors.

In particular, the embodiment of the tool 1 in which the cutting edge 6 is constituted by a plurality of straight and curved portions that are alternated to each other can be used effectively to cut fabrics, hides and synthetic fibers.

In this type of application it is particularly useful to use the abutment element, which allows to obtain a "scissor-like" effect, increasing effectiveness and precision in cutting.

In practice it has been found that the described invention achieves the intended aim and object.

The invention thus conceived is susceptible of numerous modifications and variations, all of which are within the scope of the appended claims.

All the details may further be replaced with other technically equivalent ones.

In practice, the materials used, as well as the shapes and the dimensions, may be any according to requirements without thereby abandoning the scope of the protection of the appended claims.

The disclosures in Italian Patent Application No. MO2002A000320 from which this application claims priority are incorporated herein by reference.

What is claimed is:

1. A tool device for rotary knives comprising: a tool; a handle; a tool supporting assembly that supports said tool and is connected with said handle; actuation means for rotary actuation of said tool with respect to said tool supporting assembly; a substantially tubular coupling body that is connectable to said tool supporting assembly; coupling means provided at said coupling body for a coupling thereof to said actuation means; and cutting means that are rigidly associated with said coupling body, said cutting means being arranged so as to protrude substantially radially with respect to said coupling body and comprising an active, cutting portion, the device further comprising protection means that are arranged, during cutting performed by said cutting means, proximate to said cutting means and on an opposite side thereof with respect to the active portion and at least one abutment element that is arranged proximate to said active portion during cutting.

2. A tool device for rotary knives comprising a tool; a handle; a tool supporting assembly that supports said tool and is connected with said handle; actuation means for rotary actuation of said tool with respect to said tool supporting assembly; a substantially tubular coupling body that is connectable to said tool supporting assembly; coupling means provided at said coupling body for a coupling thereof to said actuation means; and cutting means that are rigidly associated with said coupling body, said cutting means being arranged so as to protrude substantially radially with respect to said coupling body and comprising an annular plate that is connected to said coupling body proximate to one end thereof, said annular plate having at least a peripheral portion thereof arranged so as to protrude outside said coupling body and shaped so as to form a perimetric cutting edge.

3. The tool device of claim 2, wherein said cutting edge has a substantially circular shape.

4. The tool device of claim 2, wherein said cutting edge is constituted by a plurality of mutually alternating curved and straight portions.

5. The tool device of claim 2, wherein said cutting means comprise a plurality of cutting teeth that are distributed on an outer surface of said coupling body proximate to said one end, protrude substantially radially with respect to said coupling body, and form said cutting edge.

6. The tool device of claim 2, wherein said cutting edge is shaped so as to have in cross-section a cutting angle preferably comprised between 10° and 18°.

7. The tool device of claim 6, wherein said cutting edge is shaped so as to have a relief angle comprised between 2° and 6°.

8. The tool device of claim 6, wherein said cutting edge is shaped so as to have a relief angle that is equal to 4°.

9. The tool device of claim 2, wherein said cutting edge is shaped so as to have a cross-sectional angle equal to 14°.

10. The tool device of claim 2, wherein said coupling means comprises a toothed ring.

11. The tool device of claim 10, wherein said toothed ring is connected to said coupling body at an end thereof arranged on an opposite side with respect to said one and with said annular plate.

12. The tool device of claim 2, wherein said coupling body is provided at an outer surface thereof with an annular shoulder that is associated with said tool supporting assembly.

13. The tool device of claim 2, wherein said cutting means comprises an active, cutting portion, the device further comprising protection means that are arranged, during cutting performed by said cutting means, proximate to said cutting means and on an opposite side thereof with respect to the active portion.

14. The tool device of claim 13, comprising at least one abutment element that is arranged proximate to said active portion during cutting.

* * * * *